United States Patent
Lai et al.

(10) Patent No.: US 9,473,036 B2
(45) Date of Patent: Oct. 18, 2016

(54) DIRECT CURRENT VOLTAGE CONVERSION DEVICE

(71) Applicants: LITE-ON ELECTRONICS (GUANGZHOU) LIMITED, Guangzhou (CN); LITE-ON TECHNOLOGY CORP., Taipei (TW)

(72) Inventors: Wei-Lieh Lai, Taipei (TW); Ko-Fu Chou, Taipei (TW); Yi-Pin Lee, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 12 days.

(21) Appl. No.: 14/611,334

(22) Filed: Feb. 2, 2015

(65) Prior Publication Data

US 2015/0357922 A1    Dec. 10, 2015

(30) Foreign Application Priority Data

Jun. 5, 2014   (CN) .......................... 2014 1 0247171

(51) Int. Cl.
| | |
|---|---|
| *H02M 3/337* | (2006.01) |
| *H02M 3/335* | (2006.01) |
| *H02M 1/00* | (2006.01) |

(52) U.S. Cl.
CPC ....... *H02M 3/3376* (2013.01); *H02M 3/33592* (2013.01); *H02M 2001/007* (2013.01); *H02M 2001/0058* (2013.01); *Y02B 70/1433* (2013.01); *Y02B 70/1475* (2013.01); *Y02B 70/1491* (2013.01)

(58) Field of Classification Search
CPC ................. H02M 1/32; H02M 1/088; H02M 2001/0032; H02M 2001/0048
See application file for complete search history.

(56) References Cited

U.S. PATENT DOCUMENTS

| | | | | |
|---|---|---|---|---|
| 5,570,257 | A | * | 10/1996 | Manning .............. H02H 11/004 361/76 |
| 5,999,433 | A | * | 12/1999 | Hua ...................... H02M 3/337 363/132 |
| 6,023,178 | A | * | 2/2000 | Shioya ............. H02M 3/33523 327/176 |
| 6,504,270 | B1 | * | 1/2003 | Matsushita ............ H02J 9/061 307/125 |
| 7,558,083 | B2 | * | 7/2009 | Schlecht ............... H02M 3/335 363/21.06 |
| 2006/0028179 | A1 | * | 2/2006 | Yudahira .......... G01R 19/16542 320/133 |
| 2007/0008745 | A1 | * | 1/2007 | Joshi ................... H02M 3/1588 363/21.01 |
| 2008/0198638 | A1 | * | 8/2008 | Reinberger ......... H02M 3/3376 363/74 |

(Continued)

*Primary Examiner* — Matthew Nguyen
*Assistant Examiner* — Yusef Ahmed
(74) *Attorney, Agent, or Firm* — Rosenberg, Klein & Lee

(57) ABSTRACT

A direct current voltage conversion device includes a buck converter receiving a direct current input voltage and outputting a direct current first voltage according to a first control signal, a series resonant converter outputting an alternating current second voltage according to a second control signal and a third control signal, a transformer that receives the alternating current second voltage, a rectifier, and an output capacitor electrically coupled with the rectifier. The rectifier generates a direct current output voltage according to a fourth control signal and a fifth control signal, which is outputted across the output capacitor.

11 Claims, 6 Drawing Sheets

(56) References Cited

U.S. PATENT DOCUMENTS

| | | | |
|---|---|---|---|
| 2009/0303753 A1* | 12/2009 | Fu | H02M 3/33592 363/20 |
| 2011/0038182 A1* | 2/2011 | Li | H02M 3/33592 363/21.06 |
| 2011/0085354 A1* | 4/2011 | Wang | H02M 1/4225 363/21.02 |
| 2011/0090717 A1* | 4/2011 | Lee | H02M 3/33584 363/21.02 |
| 2011/0292688 A1* | 12/2011 | Zhang | H02M 1/32 363/21.02 |
| 2011/0317450 A1* | 12/2011 | Cheng | H02M 1/4241 363/20 |
| 2012/0081204 A1* | 4/2012 | Garrity | H01F 27/2847 336/221 |
| 2012/0194078 A1* | 8/2012 | Ren | H05B 33/0887 315/122 |
| 2012/0262953 A1* | 10/2012 | Jungreis | H02M 3/285 363/17 |
| 2012/0262967 A1* | 10/2012 | Cuk | H02M 7/4807 363/131 |
| 2012/0274293 A1* | 11/2012 | Ren | H02M 3/1584 323/271 |
| 2013/0300389 A1* | 11/2013 | Lee | G05F 1/565 323/282 |
| 2014/0009975 A1* | 1/2014 | Morong | H02M 3/33523 363/21.13 |
| 2014/0160799 A1* | 6/2014 | Gu | H02M 3/156 363/17 |
| 2014/0211515 A1* | 7/2014 | Tomioka | H02M 3/158 363/21.02 |
| 2015/0138848 A1* | 5/2015 | Frost | H02M 3/158 363/21.12 |
| 2015/0180353 A1* | 6/2015 | Tsai | H02M 3/33515 363/21.01 |
| 2015/0200598 A1* | 7/2015 | Kha | H02M 3/33523 363/17 |

* cited by examiner

DIRECT CURRENT VOLTAGE CONVERSION DEVICE

CROSS-REFERENCE TO RELATED APPLICATION

This application claims priority of Chinese application no 201410247171.4, filed on Jun. 5, 2014.

FIELD OF THE INVENTION

The present invention relates to a direct current voltage conversion device suitable for application to a surge load.

BACKGROUND OF THE INVENTION

A conventional direct current voltage conversion device converts a direct current input voltage into a direct current output voltage, which is lower than the direct current input voltage. The direct current output voltage must be stabilized at a required level, regardless of changes in the direct current input voltage or in an output load.

Electronic products, such as acoustic speakers, have the characteristic of drawing large amount of currents in a short amount of time. Such electronic products are called surge load, and the current drawn in the short amount of time is called surge current, which is usually more than tenfold of the current passing through a normal load. In order to provide the surge current, a conventional direct current voltage conversion device requires a transformer having a larger dimension that prevents saturation in its magnetic component, and further requires a plurality of capacitors electrically connected in parallel with the load to provide enough capacitance for maintaining the direct current output voltage within an output range. However, the transformer having a larger dimension and the plurality of capacitors inevitably increase an overall dimension of the conventional direct current voltage conversion device. These further affect a power conversion efficiency of a power supply using the direct current voltage conversion device, which may produce problems in terms of power management and increase costs.

SUMMARY OF THE INVENTION

An object of the present invention is to provide a direct current voltage conversion device that can provide a surge current for a surge load without having to increase a size of the direct current voltage conversion device.

According to the present invention, there is provided a direct current voltage conversion device adapted to receive a direct current input voltage and to output a direct current output voltage. The direct current voltage conversion device comprises:

a buck converter adapted to receive the direct current input voltage and a first control signal related to the direct current output voltage, and to output a direct current first voltage according to the first control signal;

a series resonant converter that is electrically coupled with the buck converter and that receives the direct current first voltage from the buck converter, the series resonant converter further receiving a second control signal and a third control signal, and outputting an alternating current second voltage according to the second control signal and the third control signal;

a transformer that is electrically coupled with the series resonant converter, that receives the alternating current second voltage, and that includes a first winding on a primary side of the transformer, and a second winding and a third winding on a secondary side of the transformer, each of the first winding, the second winding and the third winding having a first terminal and a second terminal, the first terminal being a dotted terminal, the first terminal and the second terminal of the first winding being electrically coupled with the series resonant converter, the first terminal of the third winding being electrically connected with the second terminal of the second winding;

a rectifier that is electrically coupled with the first terminal of the second winding and the second terminal of the third winding and that receives a fourth control signal and a fifth control signal; and an output capacitor having a first terminal electrically coupled with the second terminal of the second winding, and a second terminal electrically coupled with the rectifier.

The rectifier rectifies a voltage across the first terminal of the second winding and the second terminal of the third winding so as to generate the direct current output voltage according to the fourth control signal and the fifth control signal. The direct current output voltage is outputted across the first terminal and the second terminal of the output capacitor.

BRIEF DESCRIPTION OF THE DRAWINGS

Other features and advantages of the present invention will become apparent in the following detailed description of an embodiment with reference to the accompanying drawings, of which.

DETAILED DESCRIPTION OF THE EMBODIMENT

Figure 1:
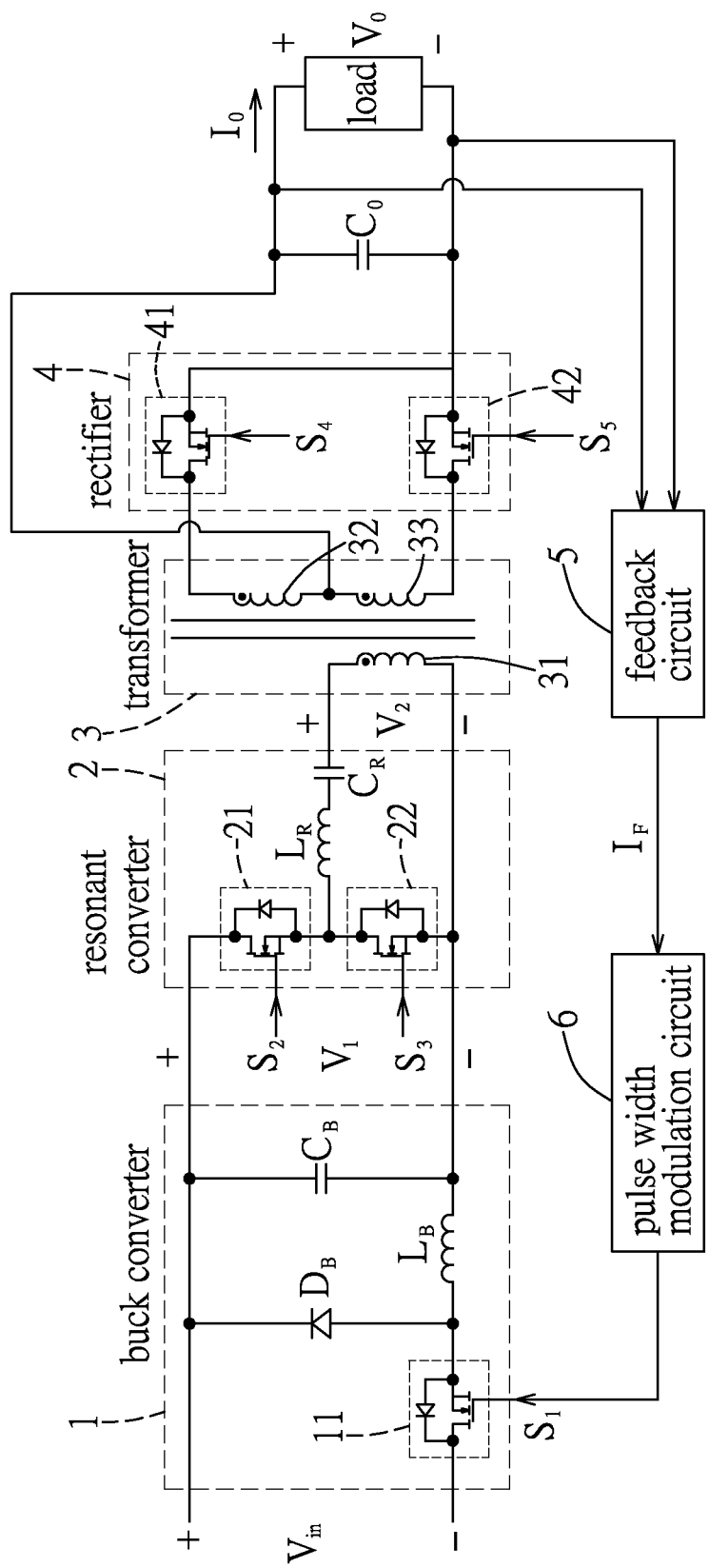
FIG. 1 is a schematic circuit diagram illustrating an embodiment of a direct current voltage conversion device of the present invention.

Referring to FIG. 1, an embodiment of a direct current voltage conversion device of the present invention includes including a buck converter 1, a series resonant converter 2, a transformer 3, a rectifier 4, an output capacitor $C_O$, a feedback circuit 5, and a pulse width modulation circuit 6. The direct current voltage conversion device is adapted to receive a direct current input voltage $V_{in}$ and to output a direct current output voltage $V_o$ to a load, which may be a surge load.

The buck converter 1 includes a first switch 11, a diode $D_B$, a first inductor $L_B$, and a first capacitor $C_B$. The buck converter 1 is adapted to receive the direct current input voltage $V_{in}$ and a first control signal $S_1$ related to the direct current output voltage $V_o$, and to output a direct current first voltage $V_1$ according to the first control signal $S_1$.

The first switch 11 has a first terminal for connection to a source of the direct current input voltage $V_{in}$, a second terminal, and a control terminal to receive the first control signal $S_1$ that controls the first switch 11 to switch between an on-state and an off-state.

The diode $D_B$ has an anode electrically coupled with the second terminal of the first switch 11, and a cathode for connection to the source of the direct current input voltage $V_{in}$.

The first inductor $L_B$ has a first terminal electrically coupled with the second terminal of the first switch 11, and a second terminal.

The first capacitor $C_B$ has a first terminal electrically coupled with the cathode of the diode $D_B$, and a second terminal electrically coupled with the second terminal of the first inductor $L_B$.

The series resonant converter 2 is electrically connected with the buck converter 1 and receives the direct current first voltage $V_1$ from the buck converter 1. The series resonant converter 2 includes a second switch 21, a third switch 22, a second inductor $L_R$, and a second capacitor $C_R$. The series resonant converter 2 further receives a second control signal $S_2$ and a third control signal $S_3$, and outputs an alternating current second voltage $V_2$ according to the second control signal $S_2$ and the third control signal $S_3$.

The second switch 21 has a first terminal electrically coupled with the first terminal of the first capacitor $C_B$ of the buck converter 1, a second terminal, and a control terminal to receive the second control signal $S_2$ that controls the second switch 21 to switch between an on-state and an off-state.

The third switch 22 has a first terminal electrically coupled with the second terminal of the second switch 21, a second terminal electrically coupled with the second terminal of the first capacitor $C_B$ of the buck converter 1, and a control terminal to receive the third control signal $S_3$ that controls the third switch 22 to switch between an on-state and an off-state.

The second control signal $S_2$ and the third control signal $S_3$ control the second switch 21 and the third switch 22 respectively, and each of the second control signal $S_2$ and the third control signal $S_3$ has a fixed frequency and a fixed duty cycle. The second switch 21 and the third switch 22 are respectively in an on-state and in an off-state in a fixed period.

The second inductor $L_R$ has a first terminal electrically coupled with the second terminal of the second switch 21, and a second terminal.

The second capacitor $C_R$ has a first terminal electrically coupled with the second terminal of the second inductor $L_R$, and a second terminal.

The transformer 3 is electrically coupled with the series resonant converter 2, and receives the alternating current second voltage $V_2$. The transformer 3 includes a first winding 31 on a primary side of the transformer 3, and a second winding 32 and a third winding 33 on a secondary side of the transformer 3. Each of the first winding 31, the second winding 32 and the third winding 33 has a first terminal and a second terminal, and the first terminal is a dotted terminal. The first terminal and the second terminal of the first winding 31 are electrically connected with the second terminal of the second capacitor $C_R$ and the second terminal of the third switch 22 of the series resonant converter 2, respectively. The first terminal of the third winding 33 is electrically connected with the second terminal of the second winding 32.

The rectifier 4 includes a fourth switch 41 and a fifth switch 92, and receives a fourth control signal $S_4$ and a fifth control signal $S_5$.

The fourth switch 41 has a first terminal electrically connected with the first terminal of the second winding 32 of the transformer 3, a second terminal, and a control terminal to receive the fourth control signal $S_4$ that controls the fourth switch 41 to switch between an on-state and an off-state.

The fifth switch 42 has a first terminal electrically connected with the second terminal of the third winding 33 of the transformer 3, a second terminal electrically connected with the second terminal of the fourth switch 41, and a control terminal to receive the fifth control signal $S_5$ that controls the fifth switch 42 to switch between an on-state and an off-state.

The rectifier 4 rectifies a voltage across the first terminal of the second winding 32 and the second terminal of the third winding 33 so as to generate the direct current output voltage $V_o$ according to the fourth control signal $S_4$ and the fifth control signal $S_5$.

In this embodiment, each of the first switch 11 of the buck converter 1, the second switch 21 and the third switch 22 of the series resonant converter 2, the fourth switch 41 and a fifth switch 42 of the rectifier 4 is a power transistor, which has a substrate diode electrically connected between the first terminal and the second terminal of the power transistor. The output capacitor $C_0$ has a first terminal electrically connected with the second terminal of the second winding 32, and a second terminal electrically coupled with the second terminal of the fourth switch 41 of the rectifier 4. The load is electrically connected in parallel with the first terminal and the second terminal of the output capacitor $C_0$. The direct current output voltage $V_o$ is outputted across the first terminal and the second terminal of the output capacitor $C_0$.

Figure 2:
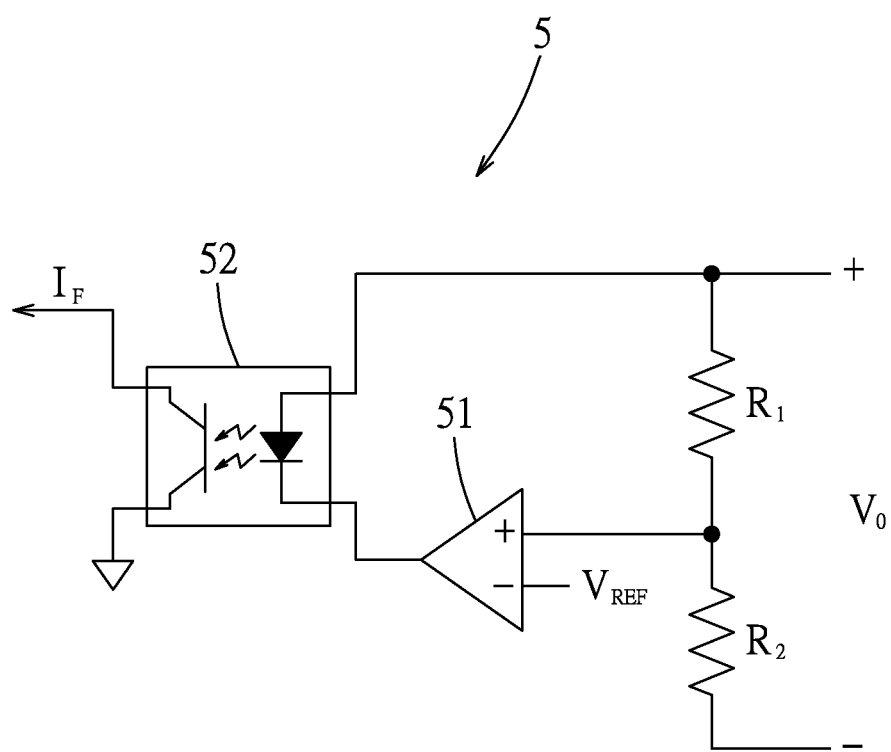
FIG. 2 is a schematic circuit diagram illustrating a feedback circuit of the direct current voltage conversion device of the present invention.

Referring to FIGS. 1 and 2, the feedback circuit 5 includes a first resistor $R_1$, a second resistor $R_2$, a comparator 51, and a photo coupler 52.

The first resistor $R_1$ has a first terminal electrically connected with the first terminal of the output capacitor $C_0$, and a second terminal.

The second resistor $R_2$ has a first terminal electrically connected with the second terminal of the first resistor $R_1$, and a second terminal electrically connected with the second terminal of the output capacitor $C_0$.

The comparator 51 has a first terminal electrically connected with the second terminal of the first resistor $R_1$, a second terminal to receive a first reference voltage $V_{ref}$, and an output terminal.

The comparator 51 is operable to output a high logic output at the output terminal when the voltage at the first terminal of the comparator 51 is greater than the voltage at the second terminal of the comparator 51, and to output a low logic output at the output terminal when the voltage at the first terminal of the comparator 51 is lower than the voltage at the second terminal of the comparator 51.

The photo coupler 52 has a first terminal electrically connected with the first terminal of the first resistor $R_1$, a second terminal electrically connected with the output terminal of the comparator 51, and an output terminal.

The photo coupler 52 receives the voltage across the first terminal of the first resistor $R_1$ and the output terminal of the comparator 51, generates a light signal having a light intensity corresponding to a magnitude of the voltage across the first terminal of the first resistor $R_1$ and the output terminal of the comparator 51, and couples the light signal to generate an intermediate signal $I_f$ at the output terminal of the photo coupler 52. A magnitude of the intermediate signal $I_f$ is related to the light intensity of the light signal. Therefore, the magnitude of the intermediate signal $I_f$ corresponds to the magnitude of the voltage across the first terminal of the first resistor $R_1$ and the output terminal of the comparator 51.

In this embodiment, the photo coupler 52 isolates the primary side and the secondary side of the transformer 3 electrically, and outputs the intermediate signal $I_f$ which is a current signal. In other embodiments, if the primary side and the secondary side of the transformer 3 do not have to be isolated electrically, other components may be used instead of the photo coupler 52, as long as the intermediate signal $I_f$ corresponds to the magnitude of the voltage across the first terminal of the first resistor $R_1$ and the output terminal of the comparator 51. Thus, the intermediate signal $I_f$ can be a voltage signal as well.

The pulse width modulation circuit 6 is electrically coupled with the feedback circuit 5 and the buck converter 1, and receives the intermediate signal $I_f$ and produces the first control signal $S_1$ based on the intermediate signal $I_f$ and a second reference voltage (not shown).

Figure 3:
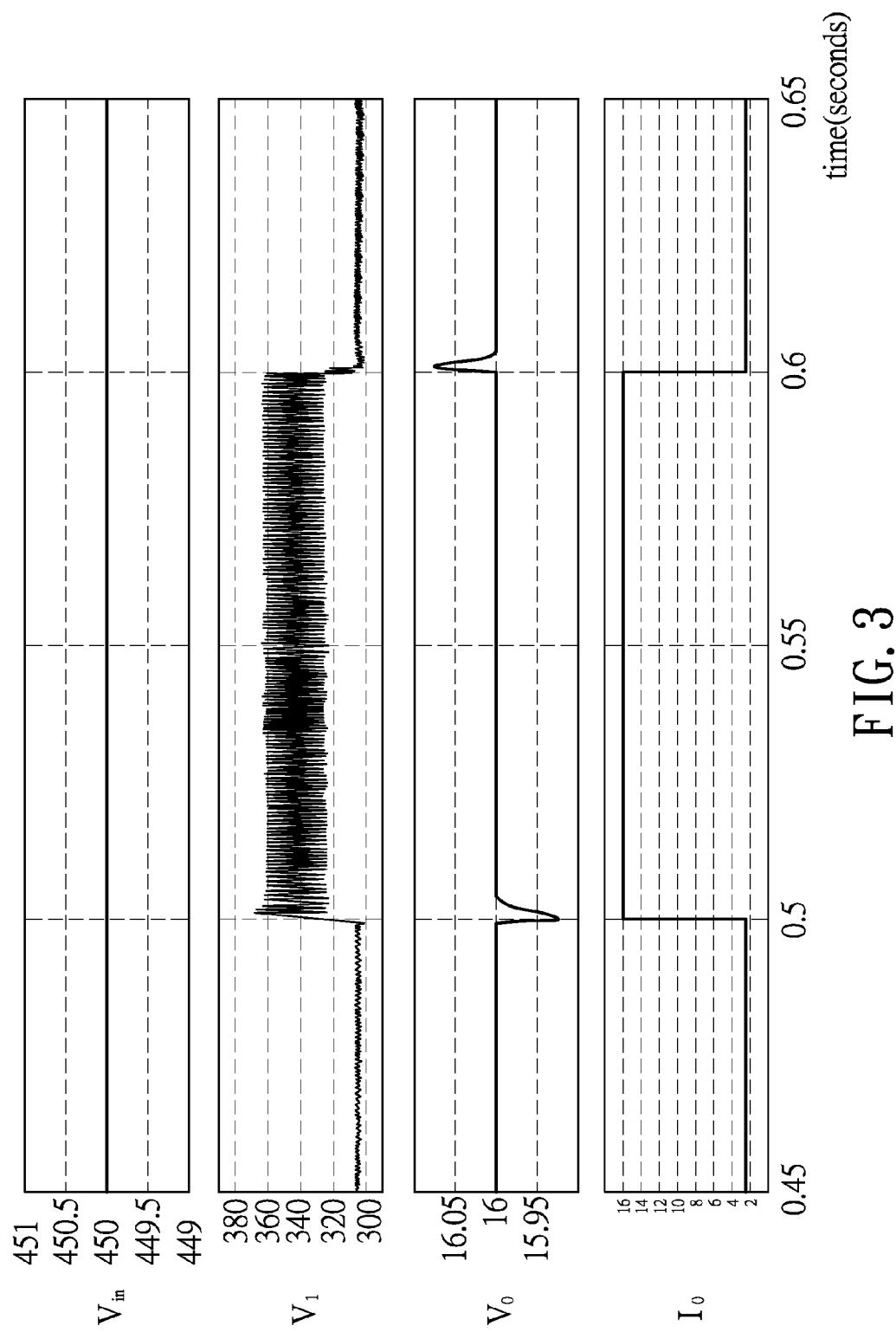
FIG. 3 is a timing diagram illustrating a simulation result of the direct current voltage conversion device of the present invention.

FIG. 3 is a timing diagram for illustrating a simulation result of the embodiment of the present invention, with the horizontal axis being time in seconds. The direct current input voltage $V_{in}$ is 450V, and the transformer 3 further includes an iron core having a PQ32/20 specification and 280 uH inductance. The turns ratio of the first winding 31, the second winding 32 and the third winding 33 is 3:1:1, and the output voltage $V_o$ is 16V. When a load current $I_0$ flowing through the load increased from 3 A to 16 A from 0.5 sec to 0.6 sec, the output voltage $V_o$ only changes by about 50 mV.

Figure 4:
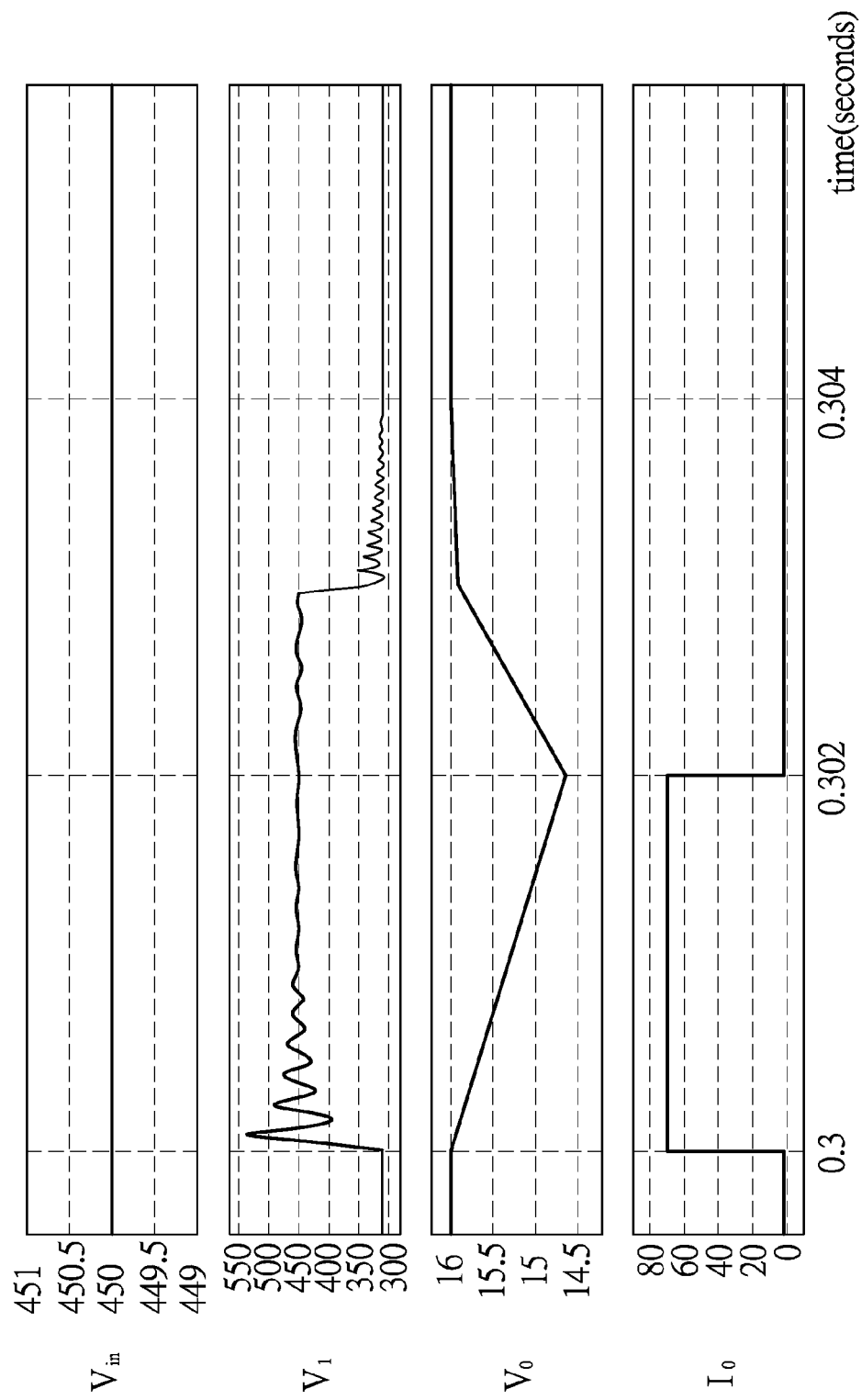
FIG. 4 is a timing diagram illustrating another simulation result of the direct current voltage conversion device of the present invention.

FIG. 4 is another timing diagram for illustrating another simulation result of the embodiment of the present invention, with the horizontal axis being time in seconds. When the load current $I_0$ flowing through the load increased from 3 A to 70 A from 0.3 sec to 0.302 sec, the output voltage $V_o$ only changes by about 1.3V.

Figure 5:
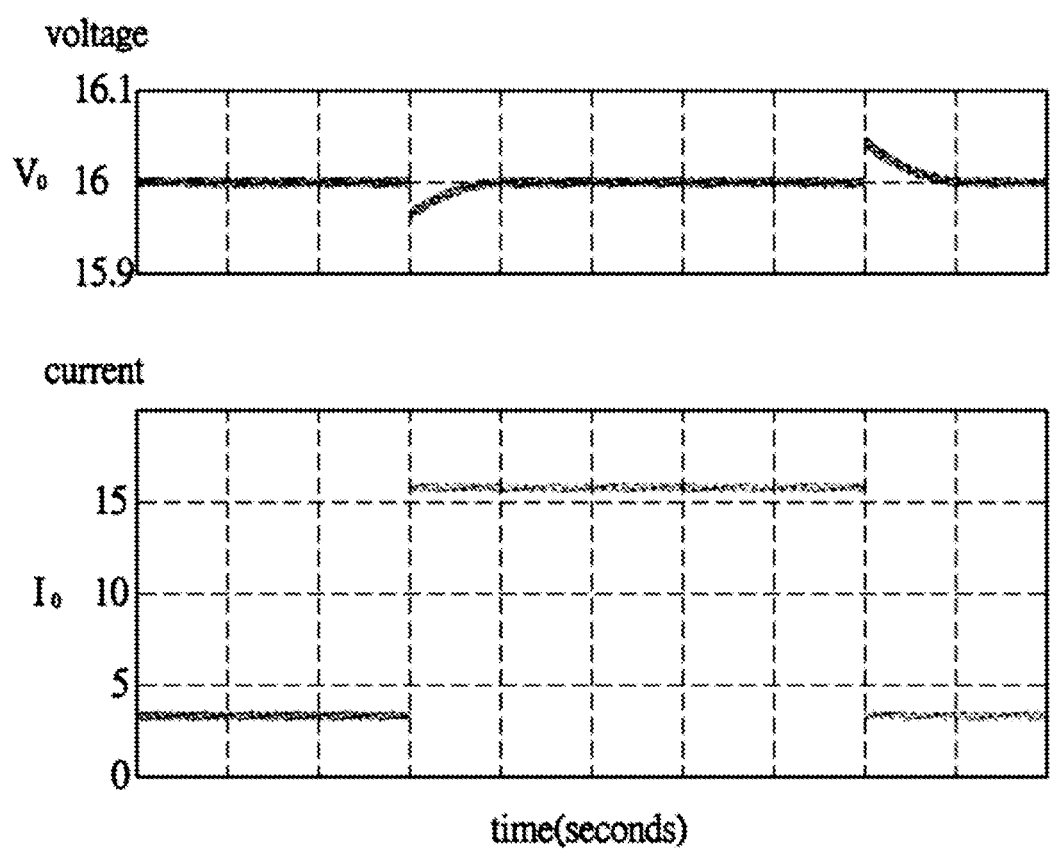
FIG. 5 is a timing diagram illustrating a measurement result of the direct current voltage conversion device of the present invention.

FIG. 5 is another timing diagram for illustrating a measurement result of the embodiment of the present invention, with the horizontal axis being time in seconds. When the load current $I_0$ flowing through the load increased from 3 A to 16 A in 100 millisecond, the output voltage $V_o$ only changes by about 46 mV.

Figure 6:
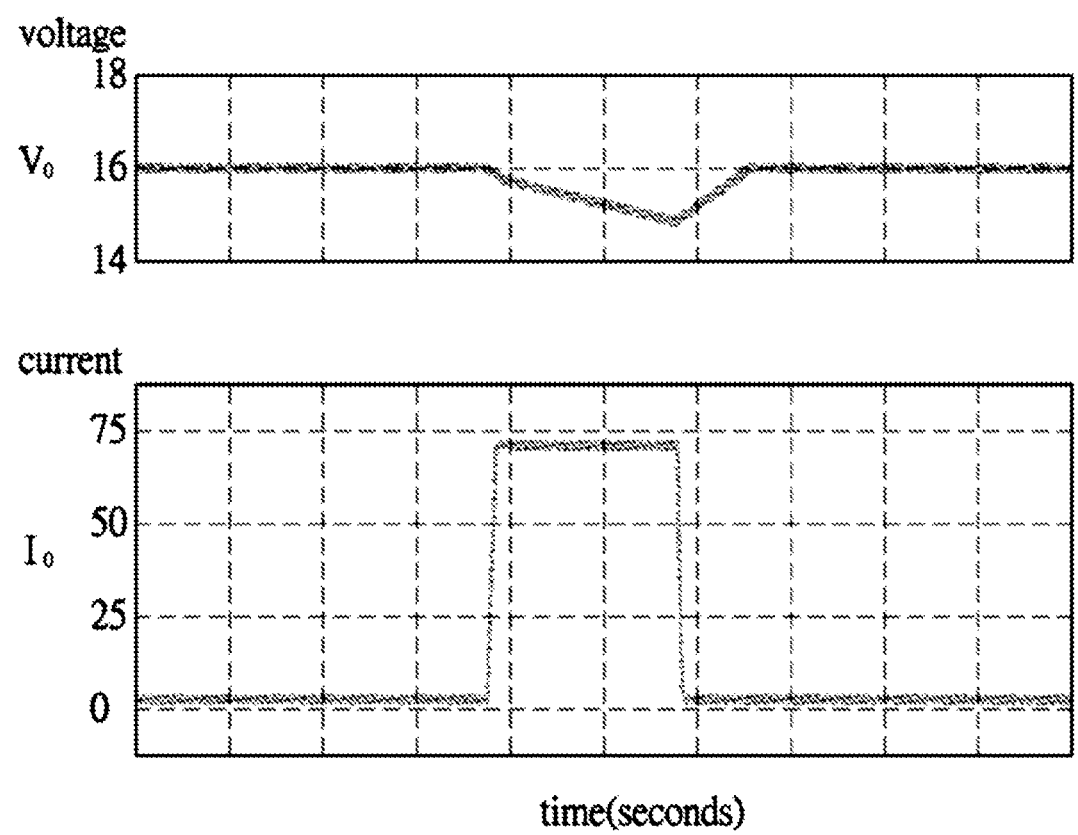
FIG. 6 is a timing diagram illustrating another measurement result of the direct current voltage conversion device of the present invention.

FIG. 6 is another timing diagram for illustrating another measurement result of the embodiment of the present invention, with the horizontal axis being time in seconds. When the load current $I_0$ flowing through the load increased from 3 A to 70 A in 2 millisecond, the output voltage $V_o$ only changes by about 1.2V.

In summary, the present invention has the following advantages:

1. The direct current voltage conversion device effectively accommodates for the current change of a surge load, and at the same time stabilizes a direct current output voltage. Referring to the simulation results and the measurement results in FIG. 3 to FIG. 6, by the cascading of the buck converter 1 and the series resonant converter 2, the direct current voltage conversion device operates in a first and a third quadrant of a magnetization curve (B-H curve). This allows for a use of an iron core having a smaller dimension, and effectively resolves the problem that exists in the prior art.

2. By controlling the series resonant converter 2 in a fixed frequency and fixed duty cycle manner, saturation of the transformer may be prevented and losses may be minimized by zero voltage switching, thus increasing conversion efficiency. Stability of the direct current output voltage $V_o$ can be maintained for an output capacitor $C_0$ having a smaller capacitance.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A direct current voltage conversion device adapted to receive a direct current input voltage and to output a direct current output voltage, the direct current voltage conversion device comprising:

a buck converter adapted to receive the direct current input voltage and a first control signal related to the direct current output voltage, and to output a direct current first voltage according to the first control signal;

a series resonant converter that is electrically coupled with the buck converter and that receives the direct current first voltage from the buck converter, the series resonant converter further receiving a second control signal and a third control signal, and outputting an alternating current second voltage according to the second control signal and the third control signal;

a transformer that is electrically coupled with the series resonant converter, that receives the alternating current second voltage, and that includes a first winding on a primary side of the transformer, and a second winding and a third winding on a secondary side of the transformer, each of the first winding, the second winding and the third winding having a first terminal and a second terminal, the first terminal being a dotted terminal, the first terminal and the second terminal of the first winding being electrically coupled with the series resonant converter, the first terminal of the third winding being electrically connected with the second terminal of the second winding;

a rectifier that is electrically coupled with the first terminal of the second winding and the second terminal of the third winding and that receives a fourth control signal and a fifth control signal;

an output capacitor having a first terminal electrically coupled with the second terminal of the second winding, and a second terminal electrically coupled with the rectifier;

the rectifier rectifying a voltage across the first terminal of the second winding and the second terminal of the third winding so as to generate the direct current output voltage according to the fourth control signal and the fifth control signal, the direct current output voltage being outputted across the first terminal and the second terminal of the output capacitor;

a feedback circuit that is electrically coupled with the first terminal and the second terminal of the output capacitor for input of the direct current output voltage, the feedback circuit having an input for receiving a reference voltage and producing an intermediate signal according to magnitudes of the reference voltage and the direct current output voltage; and a pulse width modulation circuit electrically coupled to the feedback circuit and the buck converter, the pulse width modulation circuit receiving the intermediate signal and producing the first control signal responsive to the intermediate signal;

the feedback circuit and the pulse width modulation circuit being configured to adjust the first control signal to increase the direct current first voltage responsive to a decrease in the direct current output voltage.

2. The direct current voltage conversion device as claimed in claim 1, wherein the buck converter includes:
a first switch having a first terminal for connection to a source of the direct current input voltage, a second terminal, and a control terminal to receive the first control signal that controls the first switch to switch between an on-state and an off-state;
a diode having an anode electrically coupled with the second terminal of the first switch, and a cathode for connection to the source of the direct current input voltage;
a first inductor having a first terminal electrically coupled with the second terminal of the first switch, and a second terminal; and
a first capacitor having a first terminal electrically coupled with the cathode of the diode and a second terminal electrically coupled with the second terminal of the first inductor.

3. The direct current voltage conversion device as claimed in claim 2, wherein the series resonant converter includes:
a second switch having a first terminal electrically coupled with the first terminal of the first capacitor of the buck converter, a second terminal, and a control terminal to receive the second control signal that controls the second switch to switch between an on-state and an off-state;
a third switch having a first terminal electrically coupled with the second terminal of the second switch, a second terminal electrically coupled with the second terminal of the first capacitor of the buck converter and the second terminal of the first winding of the transformer, and a control terminal to receive the third control signal that controls the third switch to switch between an on-state and an off-state;
a second inductor having a first terminal electrically coupled with the second terminal of the second switch, and a second terminal; and
a second capacitor having a first terminal electrically coupled with the second terminal of the second inductor, and a second terminal electrically coupled with the first terminal of the first winding of the transformer.

4. The direct current voltage conversion device as claimed in claim 3, wherein the rectifier includes:
a fourth switch having a first terminal electrically coupled with the first terminal of the second winding of the transformer, a second terminal electrically coupled with second terminal of the output capacitor, and a control terminal to receive the fourth control signal that controls the fourth switch to switch between an on-state and an off-state; and
a fifth switch having a first terminal electrically coupled with the second terminal of the third winding of the transformer, a second terminal electrically coupled with the second terminal of the fourth switch, and a control terminal to receive the fifth control signal that controls the fifth switch to switch between an on-state and an off-state.

5. The direct current voltage conversion device as claimed in claim 4, wherein the feedback circuit includes:

a first resistor having a first terminal electrically coupled with the first terminal of the output capacitor, and a second terminal;
a second resistor having a first terminal electrically coupled with the second terminal of the first resistor, and a second terminal electrically coupled with the second terminal of the output capacitor; and
a comparator having a first terminal electrically coupled with the second terminal of the first resistor, a second terminal to receive the reference voltage, and an output terminal;
wherein the comparator is operable to output a high logic output at the output terminal when the voltage at the first terminal of the comparator is greater than the voltage at the second terminal of the comparator, and to output a low logic output at the output terminal when the voltage at the first terminal of the comparator is lower than the voltage at the second terminal of the comparator; and
wherein the feedback circuit produces the intermediate signal according to a voltage across the first terminal of the first resistor and the output terminal of the comparator.

6. The direct current voltage conversion device as claimed in claim 5, wherein:
the feedback circuit further includes a photo coupler, the photo coupler having a first terminal electrically coupled with the first terminal of the first resistor, a second terminal electrically coupled with the output terminal of the comparator, and an output terminal;
the photo coupler receiving the voltage across the first terminal of the first resistor and the output terminal of the comparator, generating a light signal having a light intensity corresponding to a magnitude of the voltage across the first terminal of the first resistor and the output terminal of the comparator, and coupling the light signal to generate the intermediate signal at the output terminal of the photo coupler.

7. The direct current voltage conversion device as claimed in claim 6, wherein the intermediate signal is a current signal.

8. The direct current voltage conversion device as claimed in claim 3, wherein each of the second control signal and the third control signal has a fixed frequency and a fixed duty cycle.

9. The direct current voltage conversion device as claimed in claim 1, wherein the feedback circuit includes:
a first resistor having a first terminal electrically coupled with the first terminal of the output capacitor, and a second terminal;
a second resistor having a first terminal electrically coupled with the second terminal of the first resistor, and a second terminal electrically coupled with the second terminal of the output capacitor; and
a comparator having a first terminal electrically coupled with the second terminal of the first resistor, a second terminal to receive the reference voltage, and an output terminal;
wherein the comparator is operable to output a high logic output at the output terminal when the voltage at the first terminal of the comparator is greater than the voltage at the second terminal of the comparator, and to output a low logic output at the output terminal when the voltage at the first terminal of the comparator is lower than the voltage at the second terminal of the comparator; and wherein the feedback circuit produces the intermediate signal according to a voltage across the first terminal of the first resistor and the output terminal of the comparator.

10. The direct current voltage conversion device as claimed in claim 9, wherein:

the feedback circuit further includes a photo coupler, the photo coupler having a first terminal electrically coupled with the first terminal of the first resistor, a second terminal electrically coupled with the output terminal of the comparator, and an output terminal;

the photo coupler receiving the voltage across the first terminal of the first resistor and the output terminal of the comparator, generating a light signal having a light intensity corresponding to a magnitude of the voltage across the first terminal of the first resistor and the output terminal of the comparator, and coupling the light signal to generate the intermediate signal at the output terminal of the photo coupler.

11. The direct current voltage conversion device as claimed in claim 10, wherein the intermediate signal is a current signal.

* * * * *